United States Patent
El Idrissi et al.

(10) Patent No.: US 12,198,582 B2
(45) Date of Patent: Jan. 14, 2025

(54) LIGHTING SYSTEM FOR A MOTOR VEHICLE WITH DATA COMPRESSION

(71) Applicant: VALEO VISION, Bobigny (FR)

(72) Inventors: Hafid El Idrissi, Bobigny (FR); Yasser Almehio, Bobigny (FR); Constantin Prat, Bobigny (FR); Cedric Merlin, Bobigny (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 18/250,582

(22) PCT Filed: Oct. 28, 2021

(86) PCT No.: PCT/EP2021/079943
§ 371 (c)(1),
(2) Date: Apr. 26, 2023

(87) PCT Pub. No.: WO2022/090374
PCT Pub. Date: May 5, 2022

(65) Prior Publication Data
US 2023/0401985 A1    Dec. 14, 2023

(30) Foreign Application Priority Data
Oct. 30, 2020 (FR) .......................... 2011169

(51) Int. Cl.
*G09G 3/00* (2006.01)
*G09G 3/32* (2016.01)

(52) U.S. Cl.
CPC .............. *G09G 3/001* (2013.01); *G09G 3/32* (2013.01); *G09G 2340/02* (2013.01); *G09G 2380/10* (2013.01)

(58) Field of Classification Search
None
See application file for complete search history.

(56) References Cited

U.S. PATENT DOCUMENTS

| 10,764,548 B2 | 9/2020 | Thin et al. |
| 11,025,873 B2 | 6/2021 | Albou et al. |
| 2016/0173939 A1* | 6/2016 | Iwami ............... H04W 52/0261 725/139 |

FOREIGN PATENT DOCUMENTS

| DE | 102013016904 A1 | 7/2014 |
| DE | 102016210147 A1 | 12/2017 |

(Continued)

OTHER PUBLICATIONS

European Patent Office, International Search Report (with English translation) and Written Opinion of International Application No. PCT/EP2021/079943, dated Jan. 17, 2022.

(Continued)

*Primary Examiner* — Christopher J Kohlman
(74) *Attorney, Agent, or Firm* — Valeo Vision

(57) ABSTRACT

A lighting system for a motor vehicle includes at least one lighting module capable of projecting lighting functions from image data, a control unit connected to the at least one lighting module by a data transmission channel and configured to generate a control image intended for the lighting module as a function of the optical features of the lighting module and of a setpoint datum. The lighting system also includes compression and decompression units to compress and decompress the image data while the data image travels between the control unit and the at least one lighting module.

17 Claims, 2 Drawing Sheets

(56) References Cited

FOREIGN PATENT DOCUMENTS

| | | |
|---|---|---|
| EP | 3136730 A1 | 3/2017 |
| EP | 3471409 A2 | 4/2019 |
| FR | 3055946 A1 | 3/2018 |
| JP | 2000132489 A | 5/2000 |
| WO | 2017214648 A1 | 12/2017 |
| WO | 2020208818 A1 | 10/2020 |

OTHER PUBLICATIONS

Japan Patent Office, Office Action (with English translation) of corresponding Japanese Patent Application No. 2023-526630, dated Apr. 23, 2024.

\* cited by examiner

[Fig. 1]
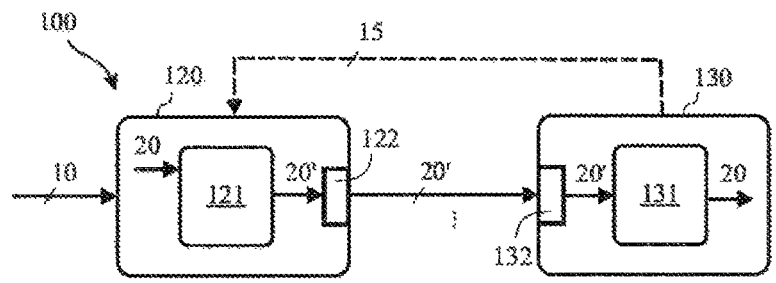
[Fig. 2]
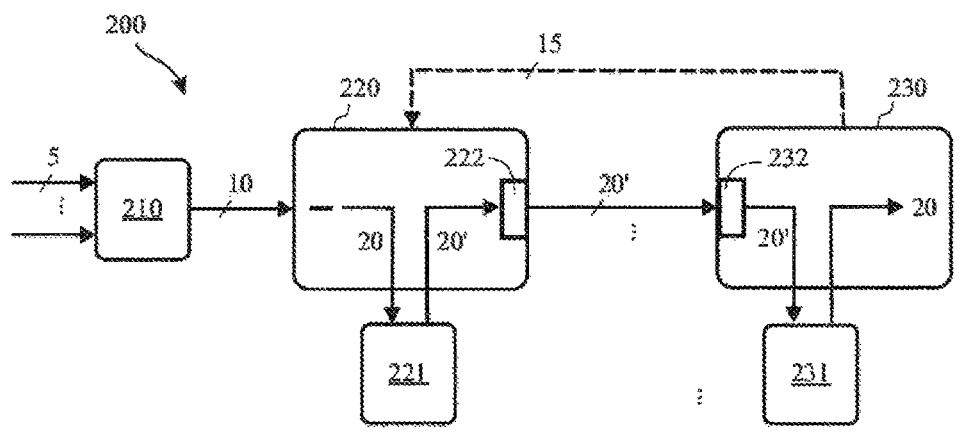
[Fig. 3]
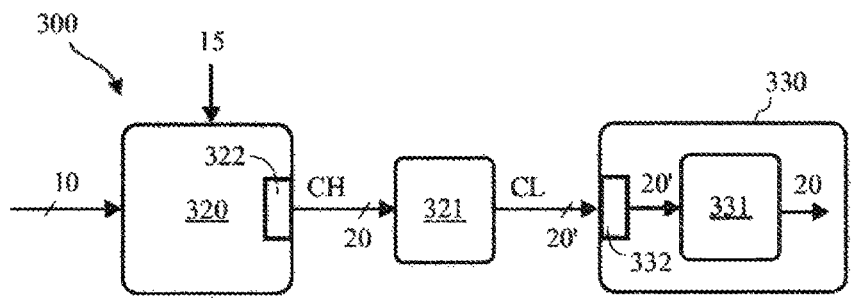

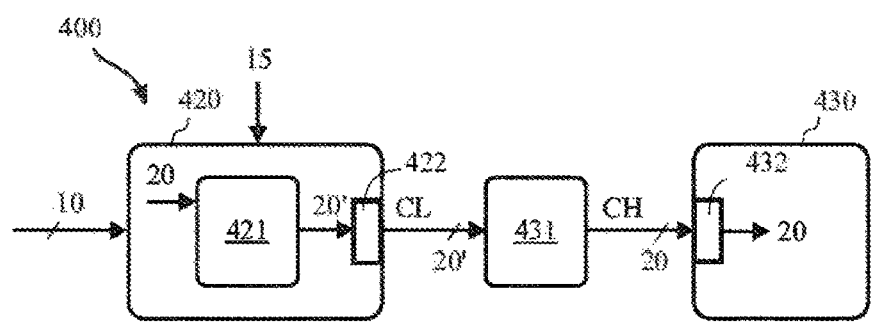
[Fig. 4]

LIGHTING SYSTEM FOR A MOTOR VEHICLE WITH DATA COMPRESSION

TECHNICAL FIELD

This invention relates to the field of lighting systems for vehicles, and more specifically to the management of the control image data of pixelated lighting sources of a motor vehicle.

BACKGROUND OF THE INVENTION

The lighting systems for current motor vehicles comprise light sources that thus allow a high-definition light beam to be projected. The desired projection of high-definition light can be obtained by means of light sources and from images, or image patterns, that the sources receive in order to display them and thus project a given light beam. These images or image patterns can reach very high resolutions, in particular as a function of the resolution of the light source that is used. By way of an example, the light source can have at least 4,000 to 30,000 pixels, thus allowing a light beam to be generated from an image with this level of resolution.

To succeed in generating such high-definition light beams, multiple light sources can be used, or even combined, which requires controlling them and precisely synchronizing these sources in order to provide managed, varied and adaptive lighting functionalities.

SUMMARY OF THE INVENTION

It is known for light sources from various types of technologies to be used to project these light beams from image data. For example, this involves monolithic technology, whereby a significant number of light-emitting diode (LED) type elementary sources equivalent to pixels are etched in a common semiconductor substrate. Integrated electrical connections allow the pixels to be activated independently of one another. Another known technology is that of microLEDs, which produces a matrix of small LEDs, typically smaller than 150 µm. Micromirror type modules (DMD "Digital Micromirror Device") also exist, which involve projection technology using an intensity modulator on a uniform beam. Micromirrors, the position of which is controlled by way of piezoelectric elements, are oriented so as to selectively reflect an incident light beam, so that each micromirror corresponds to an elementary source of the pixel matrix thus produced. The light from a source is directed onto the matrix of micromirrors by an optic.

However, these various types of technology involve close proximity between the light sources, which generates interference (also called crosstalk) in the elementary beams emitted by neighboring light sources. It has thus been observed that the light intensity of a pixel supposedly emitted by one of the light sources does not correspond to the setpoint value associated with this light source. Specifically, only a portion of the elementary beam emitted by this light source is used to produce the pixel and a portion of the elementary beams emitted by the neighboring light sources is also added thereto. The resulting light intensity is thus different from the expected setpoint value, which makes controlling the lighting module so as to emit a pixelated light beam conforming to that of the digital image provided to the controller complex and unreliable.

The light emitted by a matrix light source also generally passes through an optic comprising at least one optical lens, in order to project the desired contour ahead of the motor vehicle. However, for a given matrix light source and an output optical system associated therewith, the response of the elementary light sources of the matrix through the optical system is not homogeneous. Typically, a central region is capable of projecting at a high resolution, while the resolution decreases progressively toward the edges of the field of view of the light source, which equally can have a large aperture of the order of 35°. Therefore, it is difficult to project precise contours in low-resolution regions (i.e., on the edges of the field of view). The result of projecting a precise contour or pattern in such a region is generally a blurred contour or pattern.

It has been proposed for the optical and/or light aberrations upstream of the projection to be compensated by modifying the image data in such a way that, after projection, which generates the aberrations, the projected image is close to the original control image. Once the projection features of a light source and its associated optical device are known, these optical and light features therefore can be used in order to automatically pre-compensate for the deformations and inhomogeneities. However, as the number of light sources and of pixels per light source is high and tends to increase, the computations for carrying out this pre-compensation become increasingly heavy. This proves to be problematic for the reliable use of high-definition projectors, especially in relation to existing electronic architectures on different types of motor vehicles, generating control systems that do not always have the necessary computation resources.

A motor vehicle therefore has increasing numbers of light sources on board, which use increasingly heavy high-definition image data, which involves a large amount of data that must be managed by a control system of the motor vehicle and communicated via a transmission means between the control system and the one or more light sources. To this end, for example, a data bus of the CAN (Car Area Network) protocol type is often used to transfer such data between the control system and the light source. However, these data transmission means have the disadvantage of having a limited bandwidth, generally preventing, for example, a rate of 2 to 5 Mbps from being exceeded. As a result, problems can appear for transmitting the large amount of data required for the aforementioned high-definition images over these limited networks. In addition, these networks are also used for communicating other vehicle data, which means that the bandwidth available for the high-definition image data can be even lower, for example, limited to a range of 70 to 90% of the maximum rate possible over the data transmission network.

By way of an example, in order to communicate high-definition image data for projecting a lighting function with a resolution of 20,000 pixels, the rate required over a CAN-FD type transmission network would generally be 10 to 12 Mbps. However, such a CAN-FD network is currently actually limited to 5 Mbps (or even 2 Mbps in most cases). There is therefore a need to optimize the data transmitted over these networks, and in particular to compress the data that are communicated in order to transmit a stream of high-definition image data that is sufficient to provide the one or more associated lighting functions, while complying with the rate and bandwidth constraints of this same network.

The aim of the invention is to overcome at least one of the problems raised by the prior art. More specifically, the aim of the invention is to propose a lighting system capable of reliably projecting light beams corresponding to image data, and capable of being used on a multitude of existing architectures involving heterogeneous transmission channels.

The invention proposes a lighting system for a motor vehicle comprising:
- at least one lighting module capable of projecting lighting functions from image data;
- a control unit connected to the at least one lighting module by a data transmission channel and configured to generate a control image intended for said lighting module as a function of the optical features of said lighting module and of a setpoint datum;
- at least one data compression unit capable of compressing the image data intended for the at least one lighting module; and
- at least one data decompression unit capable of decompressing the compressed image data intended for the at least one lighting module.

Preferably, the lighting system can comprise a decision-making unit functionally connected to the control unit, and configured to generate a setpoint datum intended for the control unit, as a function of data representing the environment of the motor vehicle.

The decision-making unit can preferably comprise a microcontroller element.

Preferably, the lighting system can comprise a control system comprising a computer configured to implement the decision-making unit and the control unit.

Preferably, the control unit can comprise data transmission means capable of transmitting the image data to the at least one lighting module over a data transmission channel having a data rate lower than the rate of the image data.

The compression unit preferably can be integrated into the control unit. The control unit can comprise the compression unit.

Alternatively, the compression unit can be connected to the control unit by a data transmission channel. The transmission channel can comprise a direct connection between the tabs of the microcontrollers producing the compression unit and the control unit, respectively.

Preferably, the lighting module can comprise data reception means capable of receiving the image data intended for said lighting module over a data transmission channel having a data rate lower than the rate of the image data.

Preferably, the decompression unit can be integrated into the lighting module. The lighting module can comprise the decompression unit.

The decompression unit preferably can be connected to the lighting module by a data transmission channel. The transmission channel can comprise a direct connection between the tabs of the microcontrollers respectively producing the decompression unit and the data reception means of the lighting module.

The data transmission means can preferably comprise a network interface of the CAN (Car Area Network) type or of the CAN-FD (CAN-Flexible Data Rate) type.

The compression unit and/or the decompression unit preferably can comprise a microcontroller element.

The control unit preferably can be configured to generate the control image such that, when it is projected by the lighting module, geometric distortions and/or light inhomogeneities induced by the lighting module with respect to the setpoint datum are pre-compensated in the control image.

Preferably, the lighting system can comprise two lighting modules controlled by at least one control unit.

Preferably, the lighting system can further comprise at least one lighting unit directly controlled by a setpoint datum.

The at least one lighting module preferably can comprise at least one light-emitting semiconductor element light source, and in particular a pixelated light-emitting diode.

The invention allows a lighting system to be proposed that is capable of reliably projecting light beams corresponding to image data, and that is capable of being used on a multitude of existing architectures comprising heterogeneous data rate transmission networks.

BRIEF DESCRIPTION OF DRAWINGS

Further features and advantages of the present invention will be better understood from the description of the examples and from the drawings, in which:

FIG. 1 is an illustration of a preferred embodiment of a lighting system according to the invention;

FIG. 2 is an illustration of a preferred embodiment of a lighting system according to the invention;

FIG. 3 is an illustration of a preferred embodiment of a lighting system according to the invention;

FIG. 4 is an illustration of a preferred embodiment of a lighting system according to the invention.

DETAILED DESCRIPTION OF THE INVENTION

Unless specified otherwise, technical features described in detail for a given embodiment can be combined with the technical features described within the context of other embodiments described by way of examples and in a non-limiting manner.

The description focuses on the elements of a lighting system for a motor vehicle that are necessary for understanding the invention. Other elements, which in a known manner form part of such systems, will not be mentioned or described in detail. For example, power supply sources and systems of the various units involved, as well as heat dissipation means and other supports, are known per se and will not be described explicitly.

The illustration of FIG. 1 schematically shows a lighting system 100 for a motor vehicle according to a first embodiment according to the invention. The system comprises at least one lighting module 130 capable of projecting lighting functions from image data 20. An image is generally provided in the form of a matrix of pixel values, with each value corresponding to a degree of brightness to be produced by a corresponding elementary light source of the lighting module 130. As the light source of the lighting module comprises a large number of pixels (of the order of several hundreds to thousands), the image data 20 have a large scale.

The lighting module 130 comprises data reception means 132, such as a network interface that allows it to receive data over a corresponding data transmission channel. The lighting module 130 can comprise, for example, a pixelated light-emitting diode, or a DMD-type micromirror device, without the invention being limited to these examples. In a known manner, the lighting module can further comprise an optical projection system, not illustrated, through which the light rays generated by the light source pass, and a computer, not illustrated, capable of converting the brightness values stored in the image data 20 into cyclic ratios of a control signal of the pulse width modulation (PWM) type. The corresponding control signal is used in a known manner to control a power supply source for the pixels of the light source: the brightness emitted by a pixel is generally proportional to the average intensity of the electric current that passes through it, which is generally proportional to the PWM duty cycle. Thus, the lighting module 130 is capable of projecting a light beam corresponding to the image data 20. The lighting module is particularly characterized by optical distortion features and brightness inhomogeneities, mainly caused by the proximity of the pixels, by the optical system, or by production defects. These features 15 can be measured in the production phase of the lighting module or when mounting in a motor vehicle headlamp, and can be stored in a memory element.

The lighting system 100 also comprises a control unit 120, preferably produced by a microcontroller element programmed to this end, and is connected by a data transmission channel to the at least one lighting module 130. To this end, the control unit comprises data transmission means 122, such as a network interface, which allow it to transmit image data 20 to the at least one lighting module over the relevant data transmission channel. It can be, for example, a CAN or CAN-FD data bus in point-to-point mode, an Ethernet-type connection, or even a high-rate channel of the GMSL (Gigabit Multimedia Serial Link) type. The control unit is configured to generate the image data 20 that each lighting module 130 is to project.

The control unit 120 generates the image data 20 after receiving a lighting setpoint 10 received on a network input, and originating from a decision-making unit, not illustrated, inside the motor vehicle. The lighting setpoint notifies the control unit 120 of the lighting function that must be projected by the at least one lighting module 130. The setpoint 10 can particularly comprise one of the following datums, without being limited to these examples:

Low Beam (LB);
High Beam (HB);
Adaptive Driving Beam (ADB); or
Road Writing (RW).

Adaptive Driving Beam (ADB) is understood to mean any lighting function that allows the light beam to be dynamically varied in order to adapt it to vehicle traffic situations. For example, this can relate to a function whereby the lighting is projected with a photometry/image of the high beam type while preventing glare for other road users. As a variant or in addition, the function can relate to:

a photometry that allows dynamic directional lighting, in other words a horizontal displacement of the maximum intensity of an LB or HB photometry depending on the rotational angle of the steering wheel of a motor vehicle (also known as DBL for Dynamic Bending Light);
lighting that makes it possible to avoid glare from road signs as a result of the projection of light beams from the motor vehicle (also known as TSAG for Traffic Sign Anti-Glare);
lighting that allows the projection of line-type patterns on the road, in particular to delimit a portion of road to be taken by the motor vehicle or to present an obstacle avoidance strategy (also known as LA for Line Assist).

Road Writing (RW) is understood to mean any lighting functions allowing patterns to be projected onto the road that can be seen by the driver and/or by the road users, in particular driving assistance means, signaling signals or other navigation indicators, for example.

The control unit 120 comprises a memory element, not illustrated, that preferably stores basic photometries corresponding to each of the possible setpoints 10. Depending on the received setpoint value, the corresponding image is read in the memory element. Before being transmitted to the lighting module 130, the image data are converted taking into account the optical and/or light features 15 of the relevant lighting module 130. These data preferably can be read in the lighting module and stored in the control unit when pairing between the control unit 120 and the lighting module. Alternatively, a permanent connection between the two relevant entities can grant access to these data. The control unit 120 uses the features 15 of the lighting module 130 in order to pre-compensate any light inhomogeneities and/or distortions caused by the inherent components of the lighting module when projecting any image. For example, if a given pixel of the light source is defective, the brightness of the corresponding adjacent pixels in the image 20 can be increased to compensate for this defect. Moreover, geometric deformations at the edges of the image due to the optical lenses can be pre-compensated when generating the image 20. These potentially heavy computations, given the significant number of pixels, which can be a few thousand pixels, have no impact on the capacity of the existing computers in the motor vehicle, since the control unit 120 dedicated to the lighting modules 130 supports them.

In the illustrated example, the control unit comprises a compression unit 121, which compresses the image data 20 generated and intended for the lighting module 130 into compressed image data 20', before sending said compressed image data via the data transmission means 122. Any data compression algorithm can be used by the compression unit 121, in order to reduce the amount of data, and thus the data rate to be transmitted.

Still in the example illustrated in FIG. 1, the lighting module comprises a decompression unit 131, which is configured to decompress, in accordance with the compression algorithm that is used, the compressed image data 20' into image data 20. Preferably, the compression and/or decompression units can be produced by the same computer/microcontroller as the other computation functions described with reference to the control unit and the lighting module, respectively. Alternatively, the compression and/or decompression units can be produced by a computer core of a microcontroller with multiple computer cores.

In the example shown, a transmission channel with a reduced data rate with respect to the rate of the image data 20, for example, of the CAN-FD type, can thus connect the control unit 120 to the lighting module 130. Thus, high-definition light functions can be added to existing architectures by integrating the corresponding lighting modules 130, as well as a control unit 120 that acts as an interface between an existing decision-making unit, which generates the setpoints and the lighting modules 130.

The illustration of FIG. 2 schematically shows a lighting system 200 for a motor vehicle according to a second embodiment according to the invention. The system comprises at least one lighting module 230 capable of projecting lighting functions from image data 20. An image is generally provided in the form of a matrix of pixel values, with each value corresponding to a degree of brightness to be produced by a corresponding elementary light source of the lighting module 230. The lighting module 230 comprises data reception means 232, such as a network interface that allows it to receive data over a corresponding data transmission channel. The lighting module is particularly characterized by optical distortion features and brightness inhomogeneities, mainly caused by the proximity of the pixels (involving interference or crosstalk between neighboring pixels), or by production defects. These features 15 can be measured in the production phase of the lighting module or when mounting in a motor vehicle headlamp, and stored in a memory element. The lighting system 200 also comprises a control unit 220, preferably produced by a microcontroller element programmed to this end, and is connected by a data transmission channel to the at least one lighting module 230. To this end, the control unit comprises data transmission means 232, such as a network interface, which allow it to transmit image data to the at least one lighting module over the relevant data transmission channel. The control unit 220 generates the image data 20 after receiving a lighting setpoint 10 received on a network input, and originating from a decision-making unit 210 forming part of the system 200. The lighting system 200 is functionally equivalent to the lighting system 100 described with reference to FIG. 1. However, it integrates a decision-making unit 210, which is programmed to select a setpoint by interpreting input signals 5 provided by sensors of the motor vehicle, such as, for example, cameras. For example, when a camera detects a road sign, the decision-making unit 210 decides to provide a TSAG type setpoint. The control unit 220 generates the photometry/the corresponding image data 20 by pre-compensating them relative to the optical/brightness features of the lighting module 230.

In the illustrated example, the control unit 220 is connected to a compression unit 221 by electrical connections, which compression unit compresses the image data 20 generated and intended for the lighting module 230 into compressed image data 20', before sending said compressed image data via the data transmission means 222 of the control unit 220. Any data compression algorithm can be used by the compression unit 221, in order to reduce the amount of data, and thus the data rate to be transmitted. The use of a dedicated microcontroller for producing the compression unit 221 allows the control unit 220 to be relieved of the additional computation load required for the data compression task. Needless to say, by way of an alternative, the compression architecture of FIG. 1 also can be contemplated in this embodiment, yet without departing from the scope of the present invention.

Still in the example illustrated in FIG. 2, the lighting module comprises a decompression unit 231, which is configured to decompress, in accordance with the compression algorithm that is used, the compressed image data 20' into image data 20. The use of a dedicated microcontroller for producing the decompression unit 211 allows the control unit 230 to be relieved of the additional computation load required for the data compression task. Needless to say, by way of an alternative, the compression architecture of FIG. 1 also can be contemplated in this embodiment, yet without departing from the scope of the present invention.

In the example shown, a transmission channel with a reduced data rate with respect to the rate of the image data 20, for example, of the CAN-FD type, can thus connect the control unit 220 to the lighting module 230. Thus, high-definition light functions can be added to existing architectures by integrating the corresponding lighting modules 230, as well as a control unit 220 that acts as an interface between an existing decision-making unit, which generates the setpoints and the lighting modules 230.

The illustration of FIG. 3 schematically shows a lighting system 300 for a motor vehicle according to a third embodiment according to the invention. The system comprises at least one lighting module 330 capable of projecting lighting functions from image data 20. An image is generally provided in the form of a matrix of pixel values, with each value corresponding to a degree of brightness to be produced by a corresponding elementary light source of the lighting module 330. The lighting module 330 comprises data reception means 332, such as a network interface that allows it to receive data over a corresponding data transmission channel. The lighting module is particularly characterized by optical distortion features and brightness inhomogeneities, mainly caused by the proximity of the pixels (involving interference or crosstalk between neighboring pixels), or by production defects. These features 15 can be measured in the production phase of the lighting module or when mounting in a motor vehicle headlamp, and stored in a memory element. The lighting system 300 also comprises a control unit 320, preferably produced by a microcontroller element programmed to this end, and is connected by a data transmission channel to the at least one lighting module 330. To this end, the control unit comprises data transmission means 322, such as a network interface, which allow it to transmit image data to the at least one lighting module over the relevant data transmission channel. The control unit 320 generates the image data 20 after receiving a lighting setpoint 10 received on a network input, and originating from a decision-making unit, not illustrated. The lighting system 300 is functionally equivalent to the lighting system 100 described with reference to FIG. 1.

In the illustrated example, the control unit 320 comprises data transmission means 322 that allow connection to a first data transmission channel CH with a high data rate, for example, a GMSL type channel. However, the lighting module 330 comprises data reception means 332 that only allow connection to a second data transmission channel CL with a more limited data rate, for example, a channel of the CAN or CAN-FD type. The first channel CH connects the data transmission means of the control unit 320 to a dedicated and interposed compression unit 321, which compresses the image data 20 generated and transmitted by the control unit into compressed image data 20'. The compressed image data 20' are subsequently relayed to the lighting module 330 over a second channel of the CL type. Any data compression algorithm can be used by the compression unit 321, in order to reduce the amount of data, and thus the data rate to be transmitted. The compression unit 321 preferably comprises a microcontroller element for compressing data, a first network interface for receiving data over a channel of the CH type, and a second network interface for transmitting data over a channel of the CL type.

Still in the example illustrated in FIG. 3, the lighting module comprises a decompression unit 331, which is configured to decompress, in accordance with the compression algorithm that is used, the compressed image data 20' into image data 20. Preferably, the decompression unit can be produced by the same computer/microcontroller as the other computation functions described with reference to the lighting module. Needless to say, by way of an alternative, the compression architecture of FIG. 2 also can be contemplated in this embodiment, yet without departing from the scope of the present invention. This embodiment allows high-resolution lighting functions to be carried out with components having heterogeneous network interfaces within the same motor vehicle.

The illustration of FIG. 4 schematically shows a lighting system 400 for a motor vehicle according to a fourth embodiment according to the invention. The system comprises at least one lighting module 430 capable of projecting lighting functions from image data 20. An image is generally provided in the form of a matrix of pixel values, with each value corresponding to a degree of brightness to be produced by a corresponding elementary light source of the lighting module 430. The lighting module 430 comprises data reception means 432, such as a network interface that allows it to receive data over a corresponding data transmission channel.

The lighting module is particularly characterized by optical distortion features and brightness inhomogeneities, mainly caused by the proximity of the pixels (involving interference or crosstalk between neighboring pixels), or by production defects. These features 15 can be measured in the production phase of the lighting module or when mounting in a motor vehicle headlamp, and stored in a memory element. The lighting system 400 also comprises a control unit 420, preferably produced by a microcontroller element programmed to this end, and is connected by a data transmission channel to the at least one lighting module 430. To this end, the control unit comprises data transmission means 422, such as a network interface, which allow it to transmit image data to the at least one lighting module over the relevant data transmission channel. The control unit 420 generates the image data 20 after receiving a lighting setpoint 10 received on a network input, and originating from a decision-making unit, not illustrated. The lighting system 400 is functionally equivalent to the lighting system 100 described with reference to FIG. 1.

In the illustrated example, the control unit 420 comprises data transmission means 422 that allow connection to a first data transmission channel CL with a limited data rate, for example, a CAN or CAN-FD type channel. However, the lighting module 430 comprises data reception means 432 that only allow connection to a second data transmission channel CH with a higher data rate, for example, a channel of the GMSL type. Thus, the control unit comprises a compression unit 421, which compresses the generated image data 20 into compressed image data before transmitting said compressed image data over the first channel CL. Needless to say, the alternative compression architecture of FIG. 2 also can be contemplated, yet without departing from the scope of the present invention. The first channel CL connects the data transmission means of the control unit 420 to a dedicated and interposed decompression unit 431, which decompresses the compressed image data 20' transmitted by the control unit into decompressed image data 20. The decompressed image data 20 are subsequently relayed to the lighting module 430 over a second channel of the CH type. Any data compression algorithm can be used by the compression unit 421, in order to reduce the amount of data, and thus the data rate to be transmitted. The decompression unit 431 preferably comprises a microcontroller element for decompressing data, a first network interface for receiving data over a channel of the CL type, and a second network interface for transmitting data over a channel of the CH type. This embodiment allows high-resolution lighting functions to be carried out with components having heterogeneous network interfaces within the same motor vehicle.

Throughout all the described embodiments, the decision-making unit 210, shown in FIG. 2, can be connected to other lighting units, not illustrated, using non-pixelated, limited pixelization, or segmented lighting sources. These lighting units do not require the additional computations carried out by the control unit as described in the embodiments of the invention. These lighting units are capable of being directly controlled by a setpoint originating from the decision-making unit, such as, for example: lighting the turn lights, TI, or others.

Needless to say, the described embodiments do not limit the scope of the protection of the invention. Using the description provided above, other embodiments can be contemplated, yet without departing from the scope of the present invention.

The scope of the protection is defined by the claims.

The invention claimed is:

1. A lighting system for a motor vehicle comprising:
   at least one lighting module capable of projecting lighting functions from image data;
   a control unit connected to the at least one lighting module by a data transmission channel and configured to generate a control image intended for the at least one lighting module as a function of the optical features of the at least one lighting module and of a setpoint datum;
   at least one data compression unit capable of compressing the image data intended for the at least one lighting module wherein the at least one data compression unit is connected to the control unit by a data transmission channel; and
   at least one data decompression unit capable of decompressing a compressed image data intended for the at least one lighting module wherein the at least one decompression unit is connected to the at least one lighting module by a data transmission channel.

2. The lighting system as claimed in claim 1, further including a decision-making unit functionally connected to the control unit, and configured to generate a setpoint datum intended for the control unit, as a function of data representing the environment of the motor vehicle.

3. The lighting system as claimed in claim 2, further including a control system including a computer configured to implement the decision-making unit and the control unit.

4. The lighting system as claimed in claim 1, wherein the control unit includes a data transmission means capable of transmitting the image data to the at least one lighting module over a data transmission channel having a data rate lower than a rate of the image data.

5. The lighting system as claimed in claim 1, wherein the at least one data compression unit is integrated in the control unit.

6. The lighting system as claimed in claim 1, wherein the at least one lighting module includes a data reception means capable of receiving the image data intended for the at least one lighting module over a data transmission channel having a data rate lower than a rate of the image data.

7. The lighting system as claimed in claim 1, wherein the at least one decompression unit is integrated into the at least one lighting module.

8. The lighting system as claimed in claim 1, wherein the control unit is configured to generate the control image such that geometric distortions and light inhomogeneities that are induced by the at least one lighting module with respect to the setpoint datum are pre-compensated in the control image when it is projected by the at least one lighting module.

9. The lighting system as claimed in claim 1, wherein the at least one lighting module comprises at least one light-emitting semiconductor element light source.

10. The lighting system as claimed in claim 1, wherein the at least one lighting module includes at least one pixelated light-emitting diode.

11. A lighting system for a motor vehicle comprising:
   a lighting module capable of projecting lighting functions from an image data;
   a control unit connected to the lighting module by a data transmission channel and configured to generate a control image intended for the lighting module as a function of the optical features of the lighting module and of a setpoint datum;

a decision-making unit functionally connected to the control unit; and a data compression unit capable of compressing the image data intended for the lighting module; and a data decompression unit capable of decompressing the image data that is compressed and intended for the lighting module.

12. The lighting system of claim 11, wherein the control unit is configured to generate the control image such that geometric distortions or light inhomogeneities that are induced by the lighting module with respect to the setpoint datum are pre-compensated in the control image when it is projected by the lighting module.

13. The lighting system of claim 11, where the decision-making unit is configured to generate a setpoint datum intended for the control unit, as a function of data representing the environment of the motor vehicle.

14. The lighting system of claim 11, further including a control system including a computer configured to implement the decision-making unit and the control unit.

15. The lighting system of claim 11, wherein the control unit includes a data transmission means capable of transmitting the image data to the lighting module over a data transmission channel having a data rate lower than a rate of the image data.

16. The lighting system of claim 11, wherein the data compression unit is integrated in the control unit.

17. The lighting system of claim 11, wherein the lighting module includes at least one pixelated light-emitting diode.

* * * * *